READING APPARATUS

Filed Dec. 30, 1953 5 Sheets-Sheet 1

INVENTOR.
THOMAS I. RESS
EVON C. GREANIAS
BY
Dewey J. Cunningham
ATTORNEY

Dec. 29, 1959 T. I. RESS ET AL 2,919,425

READING APPARATUS

Filed Dec. 30, 1953 5 Sheets-Sheet 2

INVENTOR.
THOMAS I. RESS
EVON C. GREANIAS

BY

Dewey J. Cunningham

ATTORNEY

Dec. 29, 1959 T. I. RESS ET AL 2,919,425

READING APPARATUS

Filed Dec. 30, 1953 5 Sheets-Sheet 3

INVENTOR.
THOMAS I. RESS
EVON C. GREANIAS

BY

Dewey J. Cunningham
ATTORNEY

Dec. 29, 1959 T. I. RESS ET AL 2,919,425

READING APPARATUS

Filed Dec. 30, 1953 5 Sheets-Sheet 4

INVENTOR.
THOMAS I. RESS
EVON C. GREANIAS

BY Dewey J. Cunningham
ATTORNEY

INVENTOR.
THOMAS I. RESS
EVON C. GREANIAS
BY
Dewey J. Cunningham
ATTORNEY

United States Patent Office 2,919,425
Patented Dec. 29, 1959

2,919,425

READING APPARATUS

Thomas I. Ress and Evon C. Greanias, Binghamton, N.Y., assignors to International Business Machines Corporation, New York, N.Y., a corporation of New York Application December 30, 1953, Serial No. 401,312
18 Claims. (Cl. 340—149)

The present invention relates to apparatus for identifying line traces and more particularly line traces in the form of printed items such as digits or letters.

An object of the invention is to provide improved means for identifying line traces.

Another object of this invention is to furnish improved means for identifying items which are adapted to continuously move past a sensing station.

Still another object of the present invention resides in the provision of improved means for identifying printed characters which are continuously moved past a scanning station in a manner which eliminates ambiguities between different characters which have similarly formed portions.

Another object of this invention is to scan an item and provide an electrical quantity having time variations characteristic of the item in digital form and utilizing this quantity for producing an image of said item for comparison with mask means.

Another object of the invention is to provide means for scanning an item to obtain varying degrees of reflected light therefrom, producing electrical signals which are of varying magnitudes representative of said varying degrees of light and furnishing a criterion for said signals so that any signals on one side of said criterion will be considered as representative of a light area of even intensity and any signals on the other side of said criterion will be considered as representative of a dark area of even intensity.

Another object of the invention is to provide means for scanning an item having varying degrees of light reflective properties and providing signals which indicate only that an area being scanned has light reflective properties above or below a criterion degree of light reflection.

Another object of the invention is to provide means for scanning an item having varying degrees of light reflective properties and producing an image of said item which is of uniform intensity.

Another object of the present invention is to furnish improved apparatus for scanning an item having varying degrees of light reflective properties and providing signals which indicate that a certain area being scanned is too light to be considered dark and indicating this as a light area, or that said area is sufficiently dark to be considered dark and indicating this as a dark area.

A further object of the invention is to utilize positive and negative displays to be matched with positive and negative masks to eliminate ambiguities between different characters which have similarly formed portions in substantially the same positions of said characters.

A still further object of the present invention resides in the provision of improved character recognition apparatus in which tolerance is instrumented so that recognition signals must meet predetermined requirements before an identification is made.

Another object of the invention is to provide improved means for identifying items which are not required to be of special configuration.

Another object of this invention is to provide improved character recognition means in which a plurality of continuously moving characters are scanned and displayed on a moving storage medium and later compared with a plurality of masks for obtaining a recognition signal.

Another object of the invention is to provide improved means for successively scanning each of a plurality of characters and displaying the image of said characters on an image storage medium for a predetermined period of time.

Other objects of the invention will be pointed out in the following description and claims and illustrated in the accompanying drawings, which disclose, by way of examples, the principle of the invention and the best mode, which has been contemplated, of applying that principle.

In the drawings.

Similar reference numerals represent similar parts throughout the several views.

Prior attempts have been made to read printed items by electrical or electromechanical means and provide identification signals. Devices have been constructed to scan characters of special configuration to obtain information which can be analyzed to obtain an identification. The primary objection to this type of device is the necessity for providing the special characters. Other devices have provided a plurality of masks which are individually matched directly with a printed character and upon the occurrence of a match a photoelectric cell receives no light and provides a recognition signal. One deficiency of this type of device lies in the fact that ambiguities exist between certain characters such as the digits "3" and "8." For example, if light is displayed on a positive "8" the negative masks of both the digits will block light from the photocell, thereby furnishing erroneous recognition signals.

Another deficiency in this type of device is that line areas of the character which are less than completely black will continue to pass light into the photoelectric cell during the match period so as to diminish the recognition signal.

In all of the prior art devices utilizing the mask-matching technique it was necessary to stop the character which was under examination during the identification process. This inherent limitation appreciably slows the recognition speed of the device. Furthermore, in positioning the characters for examination much difficulty was experienced in registration of the character. Should the characters be spaced unequal distances apart the entire recognition circuits were thrown out of phase and either no signal or an erroneous signal was obtained.

Figure 1:
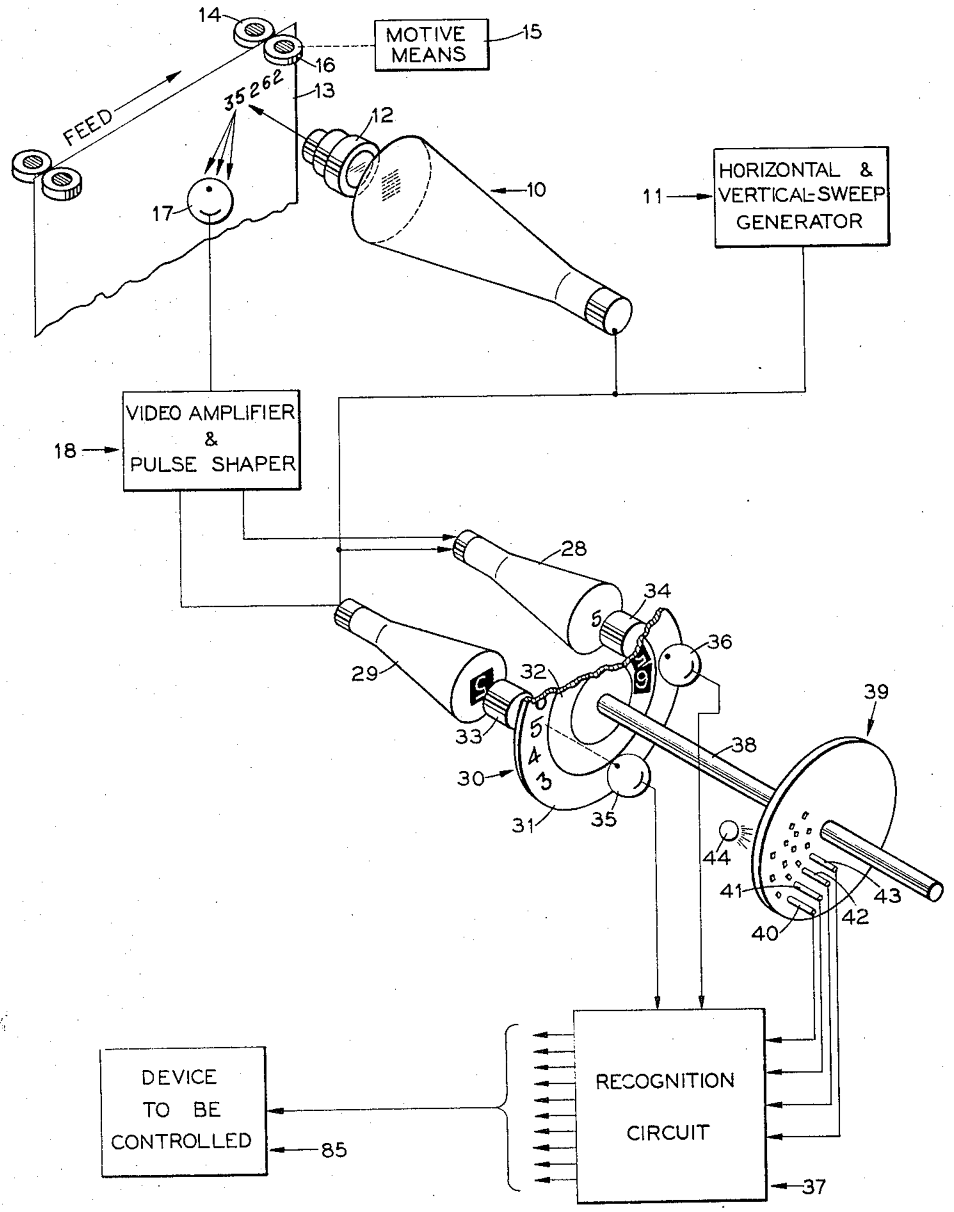
Fig. 1 is a schematic diagram of a preferred embodiment of the present invention.

The present invention proposes to overcome the above deficiencies in a manner which will become apparent from the following detailed description. Referring to Fig. 1, a preferred embodiment of the invention is shown and is seen to include a flying spot scanner 10 of conventional design which is supplied with horizontal and vertical sweep signals from sweep generator 11, said sweep generator being also of conventional design. The outline of the sweep of the flying spot is similar to the sweep of the conventional television scanning system. That is, the spot moves rapidly in a horizontal direction and slowly in the vertical direction. The usual retrace blanking is furnished. The spot of light moves across the face of scanner 10. A lens system 12 focuses the spot on a document 13 upon which the items to be identified are placed. The document is adapted to be moved in the direction indicated by the arrow. Feed roll 14 is driven by motive means 15, and document 13 is adapted to be engaged between said feed roll and idler roll 16 and moved by the rotation of said feed roll.

Figures 2, 4:
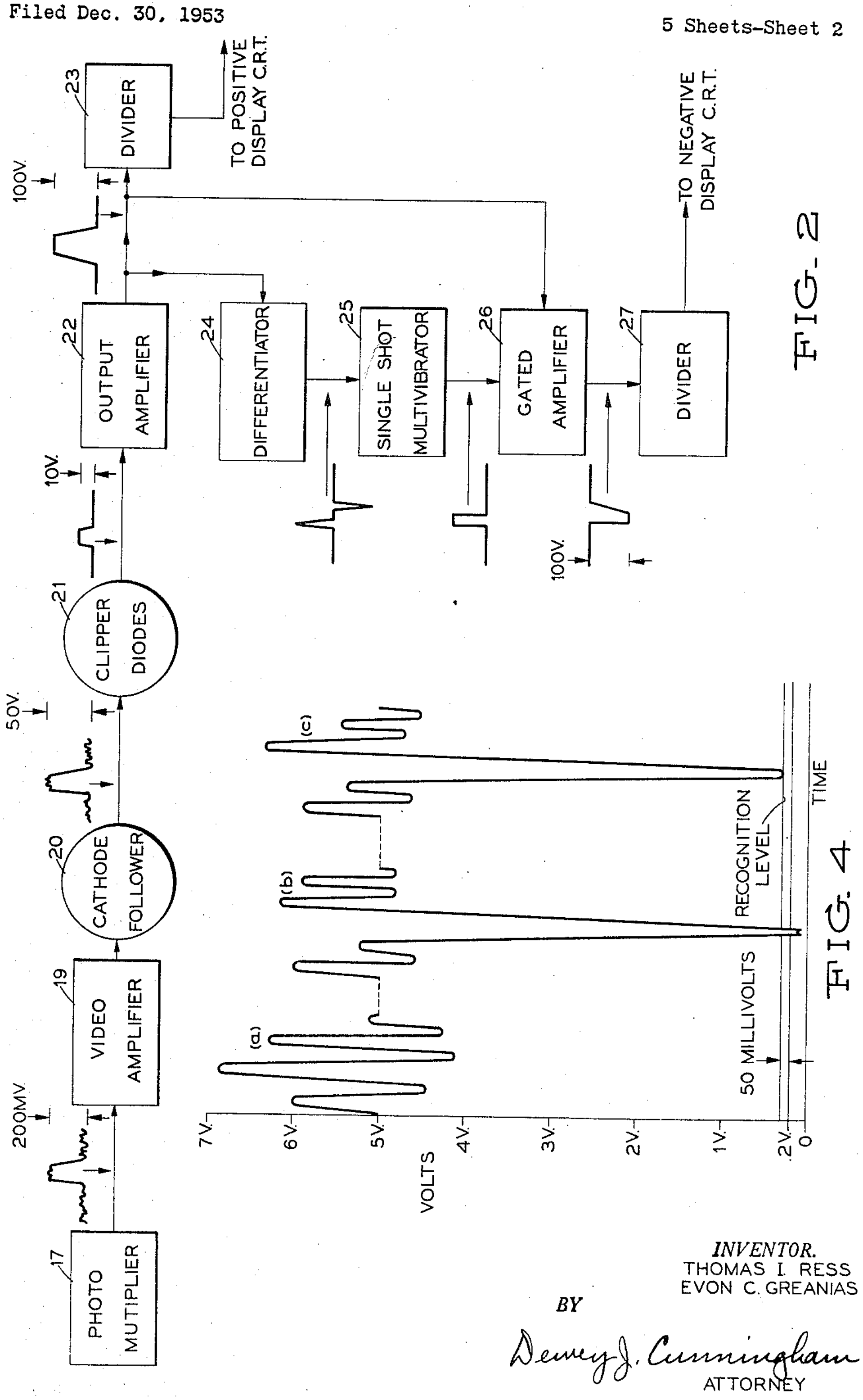
Fig. 2 is a block diagram of the video amplifier and pulse shaper used in the present invention.
Fig. 4 shows the output wave forms and the rejection level above which the wave forms must pass before a recognition signal is provided.

A plurality of digits are shown, by way of example, on document 13. The digit "5" is positioned so as to be scanned by the scanning spot. Each time the spot intersects a portion of the digit the light reflected to photomultiplier 17 is reduced to a minimum so as to provide a video signal. It will be understood that the digits have varying degrees of light reflective properties. For example, the ink on one portion thereof may be lighter than at another portion. Therefore, the signal from the photocell will have varying degrees of magnitude. Thus, an electrical quantity is produced having time variations characteristic of the digit being scanned. This video signal is fed to a video amplifier and pulse shaper, shown in block form and illustrated by reference numeral 18. The design of the amplifier and pulse shaper is shown in greater detail in Fig. 2. Referring to Fig. 2, it will be seen that characteristic wave forms are shown at different points in the circuit. The amplitude of the signals are by way of example only. It will be seen that the video signal from photo-multiplier 17 is supplied to a conventional video amplifier 19. The output of the amplifier is supplied through a cathode follower 20 and clipping diodes 21 to an output amplifier 22. The clipper diodes operate to cut off both the top and bottom of the video signal so that a signal of uniform amplitude is furnished. The level at which clipping occurs establishes the criterion between black and white. That is, a decision is made as to whether the area being scanned is dark enough to be considered black. If not, it is considered white. Therefore, a digital electrical quantity is produced having time variations characteristic of the item scanned.

The output potential from amplifier 22 is fed through a voltage divider 23 to the positive display cathode ray tube, illustrated by reference numeral 28. The output potential from amplifier 22 is also fed to differentiator 24 which produces a positive pulse of short duration at the beginning of the input pulse and a negative pulse of short duration at the end of the input pulse. When the positive and negative pulses are fed to a single shot multivibrator 25, the positive pulse triggers the multivibrator so as to produce a positive pulse of a predetermined duration which is fed to gated amplifier 26, said amplifier also being supplied with the output from amplifier 22. The positive pulse from the multivibrator disables the gated amplifier for the duration thereof. After the last-named pulse, amplifier 26 passes the remainder of the pulse from amplifier 22, this remainder appearing as a negative pulse which is fed to voltage divider 27. The output from divider 27 is fed to the negative display cathode ray tube, illustrated by reference numeral 29. The horizontal and vertical sweep voltages from sweep generator 11 are fed to cathode ray tubes 28 and 29, thus synchronizing said tubes with flying spot scanner 10. Thus, images are provided on the display cathode ray tubes which are of even intensity.

A scanning disc 30 is mounted in front of tubes 28 and 29. This disc is divided into two annular rows of positive and negative masks, designated as 31 and 32, respectively. The image of the digit on the negative display tube 29 is inverted by lens 33 and matched with the annular row of positive masks 31 while the image of the digit on the positive display tube 28 is inverted by lens 34 and matched with the annular row of negative masks 32. Photo-multiplier 35 is arranged to sense the matching of a negative display with a positive mask and photo-multiplier 36 is arranged to sense the matching of a positive display with a negative mask. When a perfect match is obtained in both instances, photo-multipliers 35 and 36 receive no light and send a recognition signal to recognition circuit 37, shown generally in block diagram form in Fig. 1 and in greater detail in Fig. 3.

In order that a recognition signal may be provided a code disc 39 is mounted on a shaft 38 upon which disc 30 is mounted. Appropriate drive means (not shown) may be provided to rotate discs 30 and 39. The coding, in the form of perforations in disc 39, may take many forms. By way of example only, the perforations are arranged in a four place binary code. Thus, it is necessary to have four photocells 40, 41, 42 and 43 which selectively receive light through the perforations in the disc from light source 44. The outputs from the last-named photocells are fed to recognition circuit 37. The arrangement is such that the signals from photocells 40—43 are in effect gated by the recognition signals from photo-multipliers 35 and 36.

Figure 3:
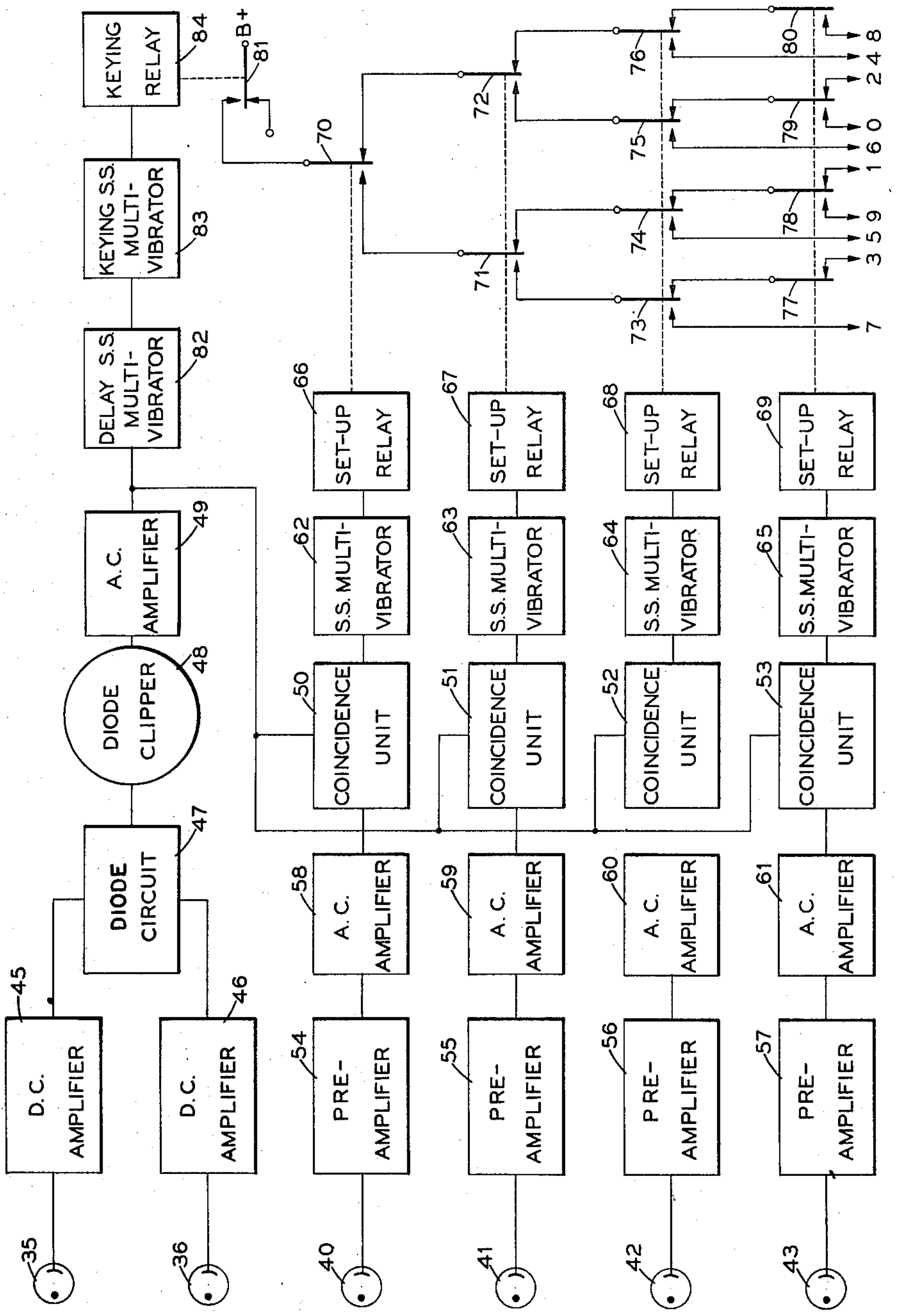
Fig. 3 is a block diagram of the recognition circuit of the present invention.

Referring to Fig. 3, the recognition circuit is shown to include D.C. amplifiers 45 and 46 which receive signals from photo-multipliers 35 and 36, respectively. These amplified signals vary in amplitude to some extent and are combined in a diode "or" circuit 47, the output of which is proportional, in magnitude, to the magnitude of the highest voltage input thereto. That is, if either of the two photomultipliers, or both, are supplying an output signal to the diode circuit 47, then the output of the diode circuit will be above a certain predetermined output voltage value, but when both photomultiplier outputs fall below a predetermined level, then the output of diode circuit 47 will also fall below its predetermined output voltage value. Accordingly, when and only when both positive and negative displays are matched by the proper negative and positive masks, an output signal having a suitable minimum magnitude is supplied from diode circuit 47. This signal has a certain amount of low magnitude noise associated therewith. In order to eliminate this noise and to furnish a recognition pulse of a predetermined magnitude, a diode clipper circuit 48 is furnished. This means that the signals fed to diode clipper 48 must reach a predetermined threshold voltage before a recognition signal will be furnished from said clipper. The reason for this requirement is for the purpose of assuring that no recognition signal will be furnished unless a correct identification is made. Thus, it is possible to provide the machine with tolerance. Referring to Fig. 4, output wave forms are shown. The signal shown at (*a*) indicates that the light received by the photo-multipliers has varied but not over a wide range. The signal has not approached the recognition zone so that no output signal is furnished. The signal shown at (*b*) has a part thereof which exceeds the recognition zone so that a recognition signal is furnished. The signal shown at (*c*) has a part thereof which extends to but does not enter the recognition zone so that a recognition signal is not provided. Therefore, even though a signal is obtained when the masks of a particular item are matched with the images thereof, the signal must be of sufficient magnitude to enter the recognition zone as defined by the upper and lower clipping levels. If it does not the item is rejected as being incapable of being identified.

The output signal thus obtained is fed to A.C. amplifier 49, the output of which is supplied to coincidence units 50, 51, 52 and 53. The binary coded signals from photocells 40, 41, 42 and 43 are amplified in pre-amplifiers 54, 55, 56 and 57, respectively, and A.C. amplifiers 58, 59, 60 and 61, respectively, and fed to said coincidence units 50, 51, 52 and 53, respectively. It will be apparent that the coded signals set up by code disc 39 are always received by the aforementioned coincidence units. Therefore, when a recognition signal is furnished to the coincidence units, the coded signals are allowed to pass to single shot multivibrators 62, 63, 64 and 65, which, when fired, energize set-up relays 66, 67, 68 and 69. It will be understood that relays 66–69 will be set up in accordance with the particular binary number presently being read. These relays may be held in a position with their contacts in a transferred position, by way of example, for 150 milliseconds. The contacts which are controlled by relays 66–69 are arranged in a conventional tree type circuit. That is, relay 66 controls transfer contact 70, relay 67 controls transfer contacts 71 and 72, relay 68 controls transfer contacts 73, 74, 75 and 76, and relay 69 controls transfer contacts 77, 78, 79 and 80. In the usual manner a circuit is set up in the tree circuit which leads to a digit channel in accordance with the binary digit set up in the relays. It will be seen that contact 81 of keying relay 84 determines whether the positive voltage is allowed to pass through the tree circuit to the appropriate digit channel. Keying relay 84 is energized by the recognition signal which is the output from A.C. amplifier 49. This signal triggers the delay single shot multivibrator 82 to provide a 50 millisecond waiting period in the keying channel while relays 66–69 are being set up. The trailing edge of the delay multivibrator pulse triggers single shot multivibrator 83 which sets up keying relay 84, thereby transferring contact 81. Thus, the positive voltage is allowed to pass through to the tree circuit and follow the path therethrough as determined by relays 66–69. The arrangement is such that the code disc output at the time of the recognition signal is the same as the digit channel to which the path through the tree circuit leads.

The device to be controlled by the pulse in a particular digit channel is illustrated generally in block form by numeral 85. It will be understood that the device may take many forms, depending upon the function which is to be carried out. For example, magnets in a record punch may be arranged to be energized by the digit channel outputs. Thus, by way of example, the magnets which set up the punch to perforate the record for the digit "3" receive their set-up signal from the digit channel 3.

The mode of operation of the first embodiment will now be described in detail. The document 13 having the items thereon which are to be identified or punched into a record in device 85 is passed continuously past the scanning station which is illustrated as a flying spot scanner. As many as thirty complete scans may be made of a character from the time it enters the scanning field until it completely leaves it. Therefore, there are times during the early and late frames of scanning when the character is not completely within the scanning pattern. The pulse output from photo-multiplier 17, when amplified, shaped and fed to positive and negative display tubes 28 and 29, respectively, produces an image on each of said display tubes which is identical with the image which is within the scanning field at the same time instant. It is possible, of course, to reproduce the image identical with the printed item, except that the image is of even intensity while the printed item may not have been. If desired, the images may be distorted by appropriate biasing circuits for comparison with the masks. During these early and late scanning frames when not all of the character is within the scanning frames, it will be seen that at least one of photo-multipliers 35 and 36 will receive light. However, when an entire character is within the scanning field, an opportunity is presented for one or more comparisons of every mask on disc 30 with the complete image of a character on the positive and negative displays. The first time a comparison is made between the positive and negative displays of a complete character with the negative and positive masks, respectively, on disc 30, of the same character, photo-multipliers 35 and 36 receive no light and supply pulses to recognition circuit 37. The signals from said photo-multipliers are amplified and fed through an "or" circuit to a clipper which eliminates the noise in the signal and clips off the peak of the signal. The lower clipping level is set so that only a recognition signal can exceed that level. The upper level is only slightly higher. The signal output from the diode clipping circuit is amplified and supplied to coincidence units 50–53. It will be seen that photocells 40–43 continuously see the different coded signals as the code disc rotates in synchronism with the mask disc. These signals are amplified and fed to coincidence units 50–53. Thus, only at a time when a recognition signal is obtained is there an output from the coincidence units, the output being used to transfer the relay contacts in the tree circuit in accordance with whatever character has been recognized. These contacts remain in a transferred condition for a predetermined period of time. During this time, the recognition signal is delayed and then used to set up contact 81 so that positive voltage from an appropriate source may pass through the tree circuit to the appropriate digit channel. The signal is then fed to the device which is to utilize this signal. As aforementioned this signal may be used to energize one or more magnets in a record perforating apparatus for placing the digit which has been read into the record. As aforementioned, several matches may be made with the mask of an item and the images thereof. However, only the first signal sets up the relay contact tree network. The remaining signals do nothing due to the length of time the relays are energized.

The masks on disc 30 may be designed to emphasize those areas of the character which are used most to discriminate characters, and are found to fail the least in a statistical study of typing quality. For example, some parts of the negative masks may be missing since they are nonessential. This eliminates the possibility of errors to some extent. Also, the positive masks may be so constructed that the line width of the character outline may be wider than that of the actual character being read. Conversely, the negative masks are so constructed that the line width of the character outline may be narrower than that of the actual character being read.

The actual electronic circuitry utilized in the various portions of the system forms no part of the present invention and has therefore not been illustrated in detail. Detailed references to several of the circuits are given herewith:

Clipper diodes 21—page 162, Fig. 171, Radar Electronics Fundamentals, Nav Ships 900, 016, Bureau of Ships, Navy Department, 1944.

Differentiator 24—pages 180–181 of Radar Electronics Fundamentals.

Diode circuit 47—pages 37–41, High Speed Computing Devices, Engineering Research Associates, McGraw-Hill, 1950.

Set-up relays 66 through 69—similar to those shown in Fig. 1, U.S. Patent No. 2,646,465.

Delay single-shot multivibrator 82 and keying single-shot multivibrator 83—page 194, Fig. 211, Radar Electronics Fundamentals.

Figure 5:
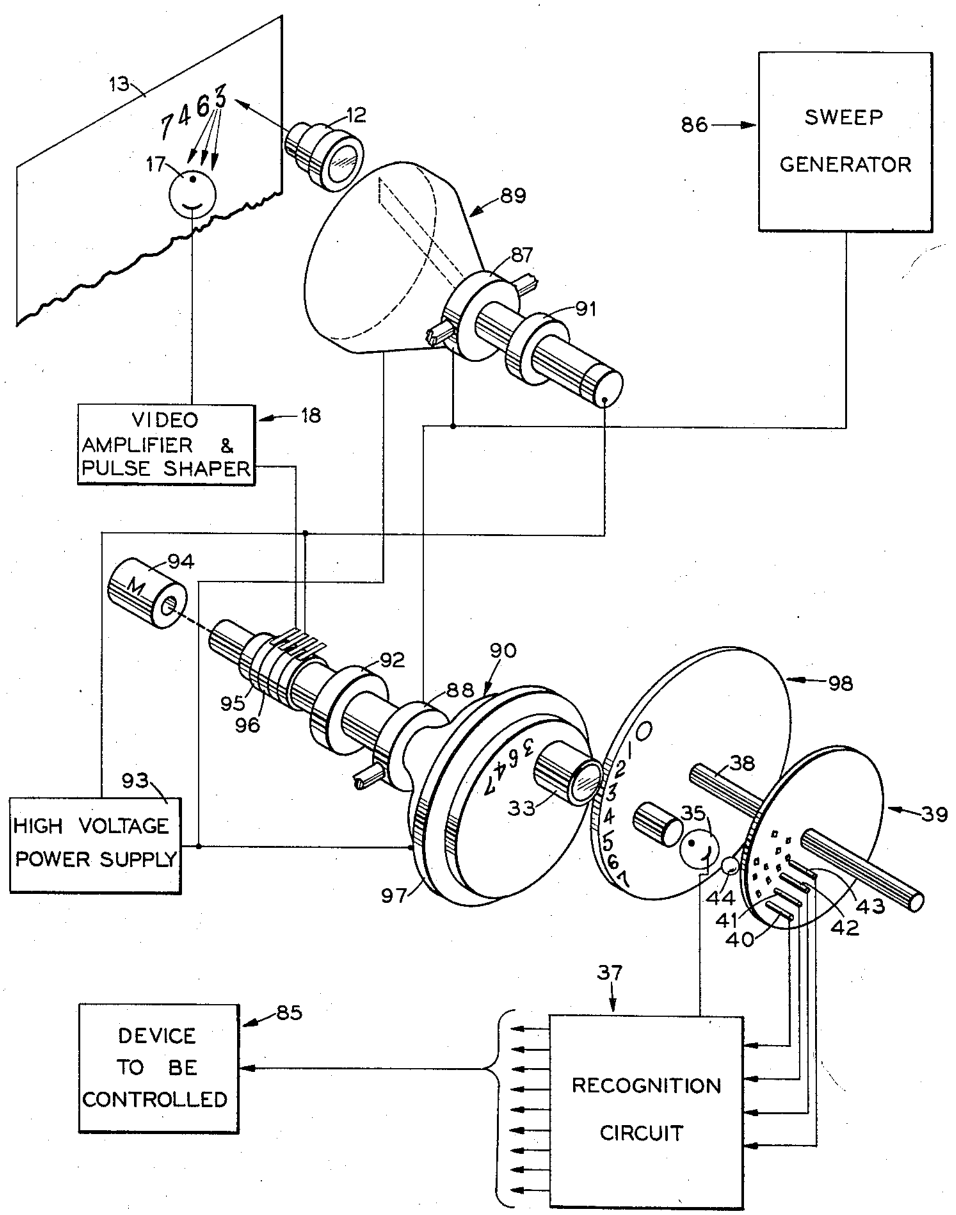
Figs. 5, 6 and 7 are schematic diagrams of other embodiments of the present invention.

The second embodiment of the present invention is illustrated schematically in Fig. 5. Certain parts of this embodiment are identical with the first embodiment and for this reason the same reference numerals are used as in the first embodiment. In the second embodiment, only a vertical sweep is utilized, and for this reason a vertical sweep generator 86 is provided. The vertical sweep signal is supplied to stationary deflection coils 87 and 88 on scanning cathode ray tube 89 and display cathode ray tube 90, respectively. Cathode ray tubes 89 and 90 are furnished with stationary focus coils 91 and 92, respectively, and with a high voltage power supply, said power supply being illustrated by reference numeral 93. The high voltage power supply is connected to the cathodes of the CRT's as well as the screens thereof.

Cathode ray tube 89 is similar to a flying spot scanner but in the present instance only furnishes a vertical scanning line. This vertical scanning line of light is projected upon the document through lens 12. As before, when the scanning line strikes a dark portion of a character, photo-multiplier 17 sends a signal to video amplifier and pulse shaper 18 which operates in the same manner as the first embodiment. The output from the video amplifier and pulse shaper is fed to display cathode ray tube 90. It will be seen that only one display cathode ray tube has been shown but it should be understood that two displays, i.e., positive and negative displays, may be provided, if desired, in accordance with the first embodiment. Display cathode ray tube 90 is adapted to be rotated by an appropriate motor 94 so that all voltage inputs thereto must be through appropriate slip rings. As shown slip ring 95 receives the video data while slip rings 96 and 97 receive the high voltage power supply input. Other slip rings may be furnished to receive any other necessary voltage supply in accordance with standard practice. The video data is used to modulate the beam intensity of the display cathode ray tube so that the images of the characters which are scanned appear adjacent the outer periphery of the screen of the display cathode ray tube. The display cathode ray tube is rotated about its axis at a speed which corresponds to the character reading rate. In this manner it is possible to scan a character completely only once. The horizontal movement of the document causes the character to pass the vertically moving scanning spot. As the right side of the character is scanned first it is this right side which first appears on the display tube. As the character moves, the display tube also moves. Thus, an entire character may be placed on the display tube with only one scan of the character and it can remain thereon until the space on the screen which it occupies must be used again. Thus, a slow phosphor may be used on the display tube screen.

The negative image on the screen of the display tube may now be compared with positive masks on disc 98 as in the first embodiment, finally leading to the application of a control signal to device 85.

The above-described second embodiment has certain inherent advantages over the first embodiment. The number of scans to be made is reduced to one complete scan for each character. Greater reading speed can be attained with the second embodiment due to the fact that there is no relative motion between the phosphor screen of the display tube and the displayed images of the characters. The speed of the phosphor is a limitation on the first embodiment insofar as reading speed is concerned, because, if the image moves across the phosphor too rapidly, the afterglow of the phosphor causes undesirable smearing of the image.

Figure 6:
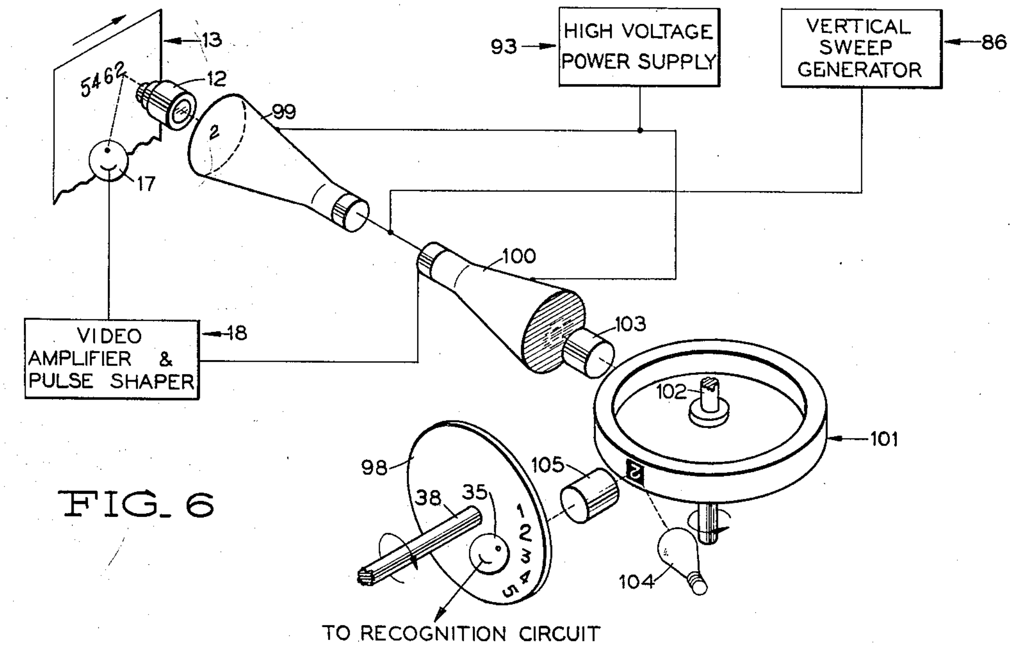
Figure 7:
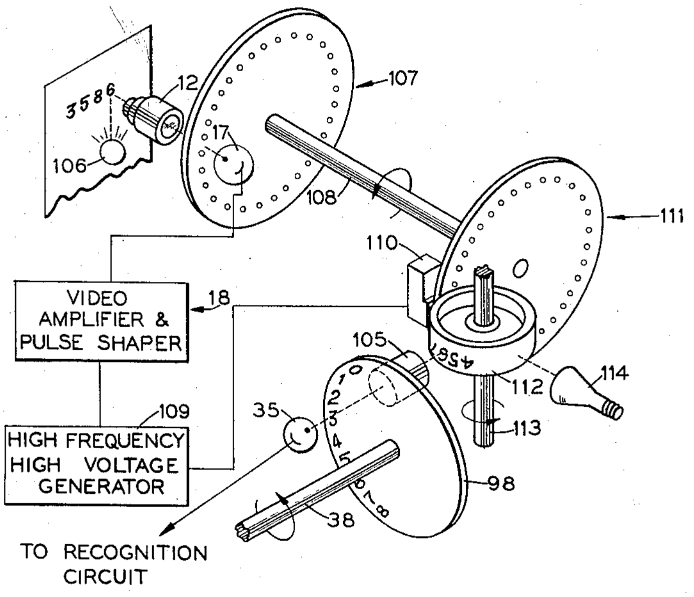

The third embodiment employs many of the principles of the second embodiment. Referring to Fig. 6, the scanning cathode ray tube 99 and the display cathode ray tube 100 are supplied with the usual high voltage power supply as well as the vertical sweep voltage. The vertically moving spot of light is adapted to traverse the character on the document which moves horizontally. As in the first embodiment, the signal output from photo-multiplier 17 is amplified and shaped in unit 18 and fed to display cathode ray tube 100. Thus, the particular portions of a character which are scanned on a particular vertical sweep appear on the screen of the display tube. A phosphor coated drum 101 is mounted on shaft 102 which is driven by appropriate motive means (not shown). This drum now rotates in front of the stationary display. Therefore, the light which appears, during a particular sweep, on the face of the display tube is projected by lens 103 to the phosphor surface of the drum. The drum is adapted to rotate about its axis in accordance with the speed at which the characters move past the scanning station. The phosphor screen of the display tube may have short persistence and emit intense blue or near ultra-violet light. The phosphor for the rotating drum is preferably of the photo-stimulable or deep trap type. These phosphors store the excitation energy by trapping electrons at elevated levels. The electrons cannot be released from their traps until they are stimulated by lower energy radiation such as infra-red. This makes it possible to release most of the stored energy in the form of emitted light during the short period the phosphor passes through the mask disc comparison station. As shown, an infra-red source 104 is arranged to have the image of the character illuminated at the time comparison is made. The image which thus becomes illuminated on the surface of disc 101 is projected through lens 105 to be matched with the masks on disc 98. When a match is achieved a signal is fed from photo-multiplier 35 to the recognition circuit in the usual manner.

The third embodiment has the advantage over the second embodiment in that it is unnecessary for the display tube to rotate. Furthermore, the phosphor coated drum may be made larger in diameter much easier than making the rotating display tube larger.

The fourth embodiment of the invention differs from the third embodiment in that mechanical scanning means replaces the electronic scanning means. The characters on the document are illuminated by a light source 106, and an enlarged image thereof is projected on the surface of a scanning disc 107 through lens 12. A plurality of apertures are furnished near the outer periphery of disc 107, all of said apertures being equally spaced from the axis of rotation. Disc 107 is mounted on a shaft 108 and driven by appropriate motive means, not shown. The scanning disc effectively causes a vertically moving spot of light to move over the image of the character in much the same manner as in embodiments two and three. The interception of the beam of light with the character outline causes a signal to be fed from photo-multiplier 17 to video amplifier and pulse shaper 18 as in the other embodiments. The pulse output from unit 18 is used to modulate the high frequency-high voltage generator 109 output, the modulated output being fed to a stationary plate 110 which is mounted adjacent the outer periphery of one side of a plastic disc 111. This disc is furnished with the same number of discharge electrodes as scanning disc 107 is furnished with apertures and is mounted on shaft 108. A phosphor drum 112 is mounted on a shaft 113 and is rotated by power means (not shown) at a speed in accordance with the speed of character movement. The discharge electrodes are adapted to pass closely adjacent the phosphor surface of drum 112. As the disc turns the moving discharge electrodes pass stationary plate 110 and pick up the high potential by capacitative coupling. The large electric field between the adjacent electrode and the grounded drum causes an electrical discharge which excites the phosphor. The moving electrodes excite the phosphor along an arc identical with the arc of the apertures scanning the image so that there is no inherent distortion in the embodiment. The excitation follows the light and dark areas in the image as the video signals modulate the high frequency voltage.

To avoid spurious wandering of the discharge, the surface of the drum is machined in a pattern of closely spaced small raised areas. Phosphor is deposited between these areas and bare metal shows at the tips. In the worst case the discharge is confined to one of four areas equally spaced from the moving point.

The image of the character passes around to the comparison station as in the third embodiment to provide an identification signal. However, in this embodiment, a long persistance photo-quenchable phosphor may be used and the images will remain good for the comparison which is made. Shortly thereafter, the drum surface is exposed to an infra-red lamp 114 which erases the image from the drum. Therefore, there is no fear of image overlap on successive revolutions of the drum.

In the embodiments which have been described above many of the components and units have been illustrated in block form since they are all very well known and familiar to those persons skilled in the art.

From the above detailed description it will be apparent that we have provided an apparatus for reading items which may be printed on a document. While the items have been shown as digits, the apparatus may be adapted to read letters of the alphabet by utilizing the same principles. The apparatus affords a means for scanning the outline of an item which has varying degrees of light reflective properties and deciding automatically if the amount of reflected light received from a particular area scanned is sufficient to consider the area as a light area or, it may decide that while more light is reflected from a particular area being scanned than would be received from a very dark area, the area should be considered as a dark area. These signals may be considered as "yes" or "no" signals. That is, "yes" this is a dark area, or "no," this is not a dark area, i.e., a light area. Such an arrangement is particularly important where typed items are to be identified. If a normal typed item is enlarged considerably, the dark portions actually may appear quite ragged. Also, the area between a dark portion of an item and the document itself will have varying degrees of light reflective properties. The criterion is set so that this would be considered a dark area insofar as the production of an image is concerned. In this manner an image of an item can be produced which is better than the original item on the document for making the comparison with the mask means much more reliable. The image produced from the signals which are furnished by the apparatus provides an image which has greater contrast and even intensity throughout.

Many mechanical problems are eliminated by having continuous motion of the document. Also, the identification speed may be increased and registration problems are eliminated. That is, should the item be out of position either horizontally or vertically, it can still be identified.

It is necessary, because of ambiguities existing between certain items, both positive and negative images may be provided for comparison with negative and positive masks, respectively. The various signals produced when the images are compared with the masks may be analyzed for determining which signal represents a time when the image of an item is compared with a mask of the same item. At this time a signal of relatively high magnitude will be received. It is possible that the comparison of an image of an item with a mask unlike the item may also produce a relatively high magnitude signal. The present invention provides a recognition zone which will eliminate the latter signal but allow the former signal to be considered as a recognition signal. The recognition signal may then be utilized to operate a device for producing a record.

The present invention also furnishes apparatus for storing a plurality of images on a storage medium for later comparison. This is particularly important where a storage medium such as a slow phosphor is used. The images may be "painted on" in bit-by-bit form to produce a complete image.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A character recognition apparatus comprising means for scanning a plurality of characters having continuous relative motion with respect thereto, detecting means adapted to provide an output signal responsive to the interception of said scanning means with said character, means responsive to said output signal for providing an image of said character, means responsive to said output signal for displaying positive and negative images of said character, a plurality of positive and negative masks arranged to be compared with said negative and positive images, respectively, and means for providing an output signal when a match is found between the images of a particular character and the masks associated with said images.

2. A character recognition apparatus comprising means for scanning a plurality of characters having continuous relative motion with respect thereto, detecting means adapted to provide an output signal responsive to the interception of said scanning means with said character, means responsive to said output signal for providing an image of said character, means responsive to said output signal for displaying positive and negative images of said character, a plurality of positive and negative masks arranged to be compared with said negative and positive images, respectively, means for providing an output signal when a match is found between the images of a particular character and the masks associated with said images, and means connected to receive the last-named output signal for providing a signal indicative of the character scanned.

3. In reading apparatus, means for producing an electrical quantity having time variations characteristic of an item to be read, means responsive to said quantity for displaying positive and negative images of said item, a plurality of negative and positive masks adapted to be sequentially compared with said positive and negative images, respectively, means for detecting variations between said masks and said images, and means for providing an output signal when the variation between said masks and said images is below a predetermined value.

4. In reading apparatus, means for producing an electrical quantity having time variations characteristic of an item to be read, means responsive to said quantity for displaying positive and negative images of said item, a plurality of negative and positive masks adapted to be sequentially compared with said positive and negative images, respectively, means for detecting variations between said masks and said images, means for providing an output signal when the variation between said masks and said images is below a predetermined value, and means responsive to said output signal for providing a signal indicative of the item read.

5. In reading apparatus, means for producing an electrical quantity having time variations characteristic of an item having continuous motion, a memory means, said memory means being responsive to said quantity for storing positive and negative images of said item thereon, a plurality of negative and positive masks arranged to be compared with said positive and negative images, respectively, means for noting the variations between said images and the masks associated therewith, and means for providing an output signal when the variation is below a predetermined value.

6. In reading apparatus, means for scanning a plurality of items having continuous motion relative thereto and producing an electrical quantity having time variations characteristic of each item scanned, a memory device having a rate of motion which is a function of the rate of motion of said items, said memory device being responsive to said electrical variations for generating images of the characters scanned and storing said images, mask means arranged to be compared with said images, means for providing signals which are a function of the variations between said images and said mask means, and means for rejecting the item when the variation exceeds a predetermined value.

7. In reading apparatus, means for scanning a plurality of items having continuous motion relative thereto and producing an electrical quantity having time variations characteristic of each item scanned, a memory device having a rate of motion which is a function of the rate of motion of said items, said memory device being responsive to said electrical variations for generating images of the characters scanned and storing said images, a comparing station including mask means arranged to be compared with the images of said items after said images have been completely generated, means for providing signals which are a function of the variations between said images and said mask means, and means for rejecting the item when the variation exceeds a predetermined value.

8. In reading apparatus, means for scanning a plurality of items having continuous motion relative thereto and producing an electrical quantity having time variations characteristic of each item scanned, a cathode ray tube having a display screen which is adapted to be rotated at a rate which is a function of the rate of motion of said items, said cathode ray tube being responsive to said electrical quantity for generating images of said items on the display screen displaced from the center thereof and storing said images for a comparing operation following the image generation, mask means arranged to be compared with said images, means for noting the variations between said mask means and said images, and means for providing an output signal when said variations are below a predetermined value.

9. In reading apparatus, means for scanning a plurality of items having continuous motion relative thereto and producing an electrical quantity having time variations characteristic of each item scanned, a drum having an image storage medium of the surface thereof, said surface being arranged to have a rate of motion which is a function of the rate of motion of said items relative to said means for scanning said items, said image storage medium being responsive to said electrical quantity for generating an image of the item scanned, said image being stored and moved from its point of generation to a comparison station, said comparison station including a plurality of masks arranged to be sequentially compared with said image and means for noting the variations between said masks and said image, and means for rejecting the item when the variations exceed a predetermined value.

10. In reading apparatus, means for scanning a plurality of items having continuous motion relative thereto and producing an electrical quantity having time variations characteristic of each item scanned, first and second drum means having an image storage medium on the surfaces thereof, said drums being rotated so that the surfaces thereof have a rate of motion which is a function of the rate of motion of said items relative to said means for scanning said items, means for utilizing said electrical quantity to provide positive and negative images of the item scanned on the storage surfaces of said first and second drum means, respectively, negative and positive mask means arranged to be compared with said positive and negative images, respectively, means for noting the variations between the comparisons made, and means for detecting and providing an output signal at the time when a match occurs simultaneously between a positive image of a particular item and the negative mask of said item and between a negative image of said item and the positive mask thereof.

11. In reading apparatus, means for scanning a plurality of items having continuous motion relative thereto and producing an electrical quantity having time variations characteristic of each item scanned, a memory device in the form of a photo-stimulable material, said memory device having a rate of motion which is a function of the rate of motion of said items relative to the means for scanning, means responsive to said electrical quantity for exciting said photo-stimulable material and producing a pattern thereon of the item scanned, a comparison station including a plurality of masks, means for stimulating the pattern on said photo-stimulable material for generating an image of said item from said pattern, said masks being arranged to be sequentially compared with said image, and means for providing an output signal upon the occurrence of a match between the mask of the item which is being presented as an image for comparison.

12. In reading apparatus, means for producing an electrical quantity having time variations characteristic of an item, a memory device in the form of a photo-stimulable material, means responsive to said electrical quantity for exciting said photo-stimulable material and producing a pattern thereon of said item, a comparison station including a plurality of masks, means for stimulating the pattern on said photo-stimulable material for generating an image of said item from said pattern, said masks being arranged to be sequentially compared with said image, and means for providing an output signal upon the occurrence of a match between the mask of the item which is being presented as an image for comparison.

13. In reading apparatus, means for producing an electrical quantity having time variations characteristic of an item, a memory device having a surface constructed of a material for storing images, a high voltage source of energy, means for modulating said high voltage source of energy with said electrical quantity for providing output signals in accordance with said electrical quantity, a plurality of electrodes arranged to be moved past the surface of said memory device, and means for applying said output signals to said electrodes as they move past said surface for producing an image of the item on said surface, a plurality of masks arranged to be compared with said image, and means for providing an output signal upon the occurrence of a match between the mask of the item which is being presented as an image for comparison.

14. In reading apparatus, means for producing an electrical quantity having time variations characteristic of an item, a memory device having a surface constructed of a material for storing images, a high voltage source of energy, means for modulating said high voltage source of energy with said electrical quantity for providing output signals in accordance with said electrical quantity, a plurality of electrodes arranged to be moved past the surface of said memory device, and means for applying said output signals to said electrodes as they move past said surface for producing an image of the item on said surface, a plurality of masks arranged to be compared with said image, means for providing an output signal upon the occurrence of a match between the mask of the item which is being presented as an image for comparison, and means for erasing said image from said storage device.

15. In reading apparatus, a scanning station comprising means for scanning an item on a document presented at said scanning station, said item having varying degrees of light reflecting properties, means for detecting the varying degrees of light reflected from said item and providing signals having magnitudes which vary with time in accordance therewith, means for establishing a criteria for said signals, and means responsive to the signals on one side of said criteria for producing an outline of said item having an even intensity.

16. In reading apparatus, a scanning station, said scanning station comprising means for scanning items on a document presented at said scanning station, said items having varying degrees of light reflecting properties, means for producing an electrical quantity having magnitudes which vary with time in accordance with the varying degrees of light reflected from said item as it is being scanned, and means for establishing a criterion for said signals, the signals which appear on one side of said criterion being considered as representative of a light area and the signals which appear on the other side of said criterion being considered as representative of a dark area, and means for detecting which signals are on a particular side of said criterion.

17. In reading apparatus, a scanning station comprising means for scanning items presented at said scanning station and having motion relative thereto, said items having varying degrees of light reflective properties, means for detecting the varying degrees of light reflected from said item during said scanning operation and providing signals having magnitudes which vary with time in accordance therewith, means for establishing a criterion for said signals, and image storage means, said image storage means being responsive to the signals on one side of said criteria for producing the image of an item having an even intensity and a rate of motion proportional to the rate of movement of said items relative to said scanning station.

18. A character recognition system comprising, in combination, scanning means for scanning characters to be recognized and generating electrical signals varying with time in accordance with the character scanned, limiting means connected to said scanning means for establishing voltage limits for said signals, character synthesizing means connected to said scanning means for reproducing optical positive and negative images of the character scanned, a plurality of positive and negative masks arranged to be sequentially compared with said negative and positive images respectively, and coincidence means for providing an output signal when and only when a match is found between the images of a particular character and the masks associated with said images.

References Cited in the file of this patent

UNITED STATES PATENTS

| | | |
|---|---|---|
| 1,828,556 | Cremer | Oct. 20, 1931 |
| 1,915,993 | Handel | June 27, 1933 |
| 2,373,114 | Goldsmith | Apr. 10, 1945 |
| 2,512,038 | Potts | June 20, 1950 |
| 2,525,891 | Garman | Oct. 17, 1950 |
| 2,575,909 | Davis et al. | Nov. 20, 1951 |
| 2,575,910 | Mathes | Nov. 20, 1951 |
| 2,615,992 | Flory | Oct. 28, 1952 |
| 2,640,872 | Hartley | June 2, 1953 |
| 2,646,465 | Davis et al. | July 21, 1953 |
| 2,685,615 | Biddulph et al. | Aug. 3, 1954 |
| 2,702,380 | Brustman | Feb. 15, 1955 |
| 2,754,360 | Dersch | July 10, 1956 |